C. H. SHAW.
SOUND BOX.
APPLICATION FILED MAY 6, 1915.

1,269,965.

Patented June 18, 1918.

INVENTOR
Charles H. Shaw
BY
ATTORNEY

UNITED STATES PATENT OFFICE.

CHARLES H. SHAW, OF BABYLON, NEW YORK, ASSIGNOR TO THE AEOLIAN COMPANY, A CORPORATION OF CONNECTICUT.

SOUND-BOX.

1,269,965.   Specification of Letters Patent.   Patented June 18, 1918.

Application filed May 6, 1915.  Serial No. 26,331.

*To all whom it may concern:*

Be it known that I, CHARLES H. SHAW, a citizen of the United States, residing at Babylon, in the county of Suffolk and State of New York, have invented certain new and useful Improvements in Sound-Boxes, of which the following is a specification.

Figure 1:
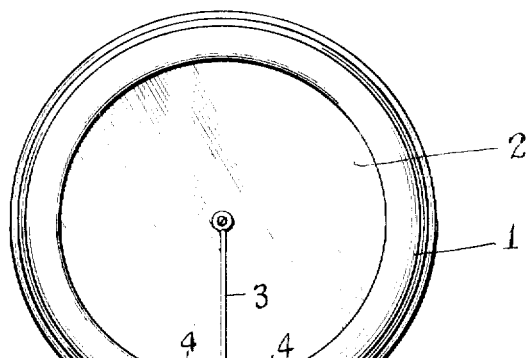
Figure 2:
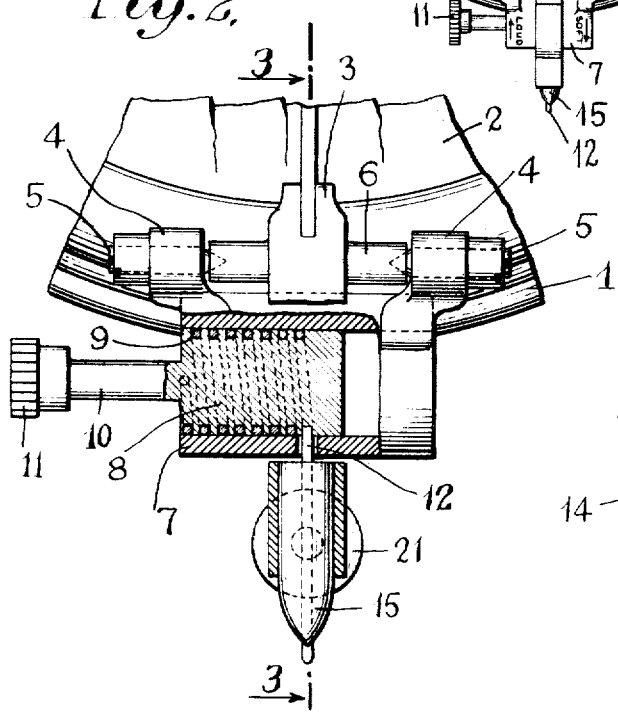
Figure 3:
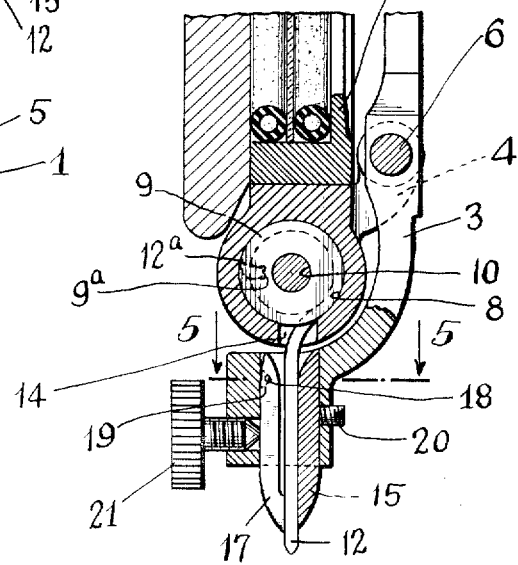
Figure 4:
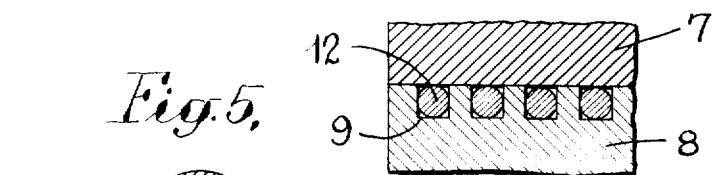
Figure 5:
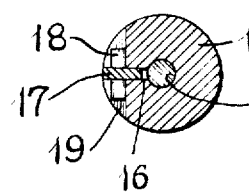

My present invention relates to improvements in sound-boxes, especially to means for employing a wire stylus in connection therewith and for quickly adjusting it at will to play the phonograph record with any desired degree of loudness or softness. The object and advantages of my invention will be apparent to those skilled in the art from an understanding of the following description in connection with the drawings. In these, Figure 1 is a face view of a sound-box embodying my invention; Fig. 2 is an enlarged detail view of the lower portion of Fig. 1, shown partly in vertical section and partly in elevation; Fig. 3 is a sectional view on the line 3—3 in Fig. 2 looking in the direction of the arrows; Fig. 4 is an enlarged fragment of Fig. 2; and Fig. 5 is a horizontal section on the line 5—5 in Fig. 3 looking in the direction of the arrows.

I will now describe the specific devices of the drawings, illustrating one embodiment of my invention. The general features of the sound-box may have any desired or preferred form, those shown comprising a casing 1, diaphragm 2, stylus bar 3, and a pivotal suspension therefor comprising the lugs 4—4 supported stationarily on the sound-box casing 1, and pivot screws 5—5 supported respectively in said lugs, with their points coöperating with appropriate centers in the cross-piece 6 of the stylus-bar.

The free end of the stylus bar 3 is bent so as to bring its stylus-holding extremity at the peripheral edge of the box. Between it and said edge is a space wherein is located an open-ended, cylindrically hollow casing 7 forming part of or mounted stationarily on the sound-box casing. 8 is a spool rotatable snugly within the cylindrical hollow of the casing 7; and is also movable endwise therein. 9 is a spiral groove or screw-thread on this spool. 10 is the stem of the spool having a knurled head or finger-piece 11.

12 is a piece of wire, preferably piano wire about 7 thousandths of an inch in diameter which is housed ready for use in a spiral coil surrounding the spool 8 located in the spiral groove 9. One end 12ª of this wire is bent so as to project into a radial hole 9ª in the spool at the last or rearmost spiral. This conveniently anchors said end of the wire to the spool, so that rotation of the spool will cause the wire to wrap around it and vice versa to unwind from it. The opposite free end of the wire projects through a hole 14 in the bottom wall of the spool-casing 7, thence through wire clamping means supported on the free end of the stylus-bar. This means comprises a tubular part or nipple 15 having its wall longitudinally slotted at 16, in which slot there is a movable jaw 17 having a cross-pin 18 at its upper end located in a pair of notches 19—19 formed in the outside of the nipple 15 adjacent the slot therein. In assembling the parts, the nipple and jaw are inserted up into the cylindrical hole formed to receive them in the free end of the stylus bar 3 as shown in Fig. 3, and a set screw 20 fixes the nipple rigidly therein. 21 is a thumb-screw positioned to bear against the locking jaw 17 and adapted when tightened to cause the stylus wire to be clamped between the free end of said jaw 17 and the nipple part 15, and vice versa to permit said wire stylus to be released preparatory to effecting a readjustment of said stylus.

On the spool casing 7 will be marked two arrows as shown in Fig. 1 with the words "Soft" and "Loud" respectively, or their equivalents such as "Out" and "In" respectively. This indicates to the user that to play more softly the finger piece 11 should be turned in the direction of the "soft" arrow; and to play more loudly should be turned in the direction of the "loud" arrow. In the first case, the spool will be rotated in the direction which unwinds the wire therefrom and which causes it to be delivered to an extent proportionate to the rotation through the hole 14 and thence through the nipple 15 so that its record engaging point is made to project to a greater distance than formerly which means that it will have less rigidity and will play more softly. In the second case, the rotation being in the direction of wrapping the wire to a still greater extent about the spool, its record-engaging point will be retracted and will have relatively greater rigidity and will play louder. Thus the wire-stylus can be adjusted to play any and all degrees of tone desired from the loudest to the softest and all gradations between, by a simple turn of the finger-piece 11. Of course after the wire has been adjusted to project to the desired extent, the clamping screw 21 will be tightened so as to grip the wire as a preliminary to playing the record.

The spiral groove 9 in which the wire lies keeps its natural springiness within bounds and also controls or supports its flimsiness so that it can be successfully adjusted as described.

The side-walls of the spiral groove 9 are substantially normal to the surface of the spool, that is to say are not inclined thereto to any great extent, because if they are, the wire will tend to wedge and jam between said inclined side-walls and the inside of the spool-casing when the spool in its rotation moves endwise therein, thereby either seriously interfering with or nullifying the operation of the device.

In the actual device, it is easily possible to house and handle a length of wire sufficient to play a great many thousand records. Further this wire may be replaced, when used up, without removing the spool. To do this, the user positions the spool both lengthwise and rotatably within its casing so that the socket 9ª is alined with the bore of the nipple 15. The end of the wire will then be inserted through said nipple into said socket. The finger piece 11 will then be rotated in the direction of the "loud" or "in" arrow, which will result in bending the wire just beyond its extremity 12ª (Fig. 3) in the socket 9ª, so that the rest of the wire will be laid down in the spiral groove and wrapped about the spool by the rotation of the finger piece 11 which will be continued until all but the free end of the wire is drawn into the nipple.

Of course some changes and modifications might be made in the above that are nevertheless within the spirit of this inventive disclosure and these I mean to cover by the annexed claims under the doctrine of equivalents. Further certain of the means might be used without the remainder or in connection with equivalent means.

What I claim is:

1. The combination, with a sound-box, of a stylus-wire, a rotatable part on which the wire is wound, a rotatable part having a spiral groove wherein the wire is located.

2. The combination, with a sound-box, of a stylus-wire, a rotatable part on which the wire is wound and by which it is adjustable, the stylus bar, and means for operatively securing the free end of the wire to said bar, the rotatable part having a spiral groove wherein the wire is located.

3. The combination, with a sound-box, of a stylus bar, stylus clamping means on said bar, a stylus wire passing through said clamping means, and a rotatable part on which said wire is wound and by which the extent of its projection from said clamping means is adjustable, the rotatable part having a spiral groove wherein the wire is located.

4. The combination with a sound-box, of a stylus-wire, and a rotatable part on which the wire is wound and by which it is adjustable, the rotatable part having a spiral groove wherein the wire is located, said groove having a socket leading therefrom adapted to anchor the wire at one end.

5. The combination with a sound-box, the stylus-bar, a stylus wire, means for operatively securing the free end of the wire to said bar, and a spirally grooved rotatable part wherein the wire is located.

6. The combination with a sound-box, the stylus-bar, a stylus wire, means for operatively securing the free end of the wire to said bar, and a spirally grooved rotatable part to which the other end of the wire is attachable with the wire located in said groove.

7. The combination with a sound-box and its stylus bar, of a stylus-wire, a stylus bar having a clamp-controlled eye for operatively receiving one end of said wire, and a spirally grooved rotatable part to which the other end of the wire is attachable with the wire located in said groove and by which it is deliverable opposite the eye of the stylus bar.

8. The combination with a sound-box, of a stylus-wire, a stationary cylindrically hollow casing having a hole through it to deliver one end of said wire into an operative playing position, and a spool within said casing about which the wire is wound, said spool being arranged for both rotary and endwise movement to feed said wire through the hole in said hollow casing.

9. The combination with a sound-box and its stylus-bar, of a stylus-wire, the stylus bar having a clamp-controlled eye for operatively receiving one end of said wire, a stationary cylindrically hollow casing having a hole through it to deliver said end of the wire opposite said eye, and a spirally grooved rotatable and endwise movable spool within said casing to which the other end of the wire is attachable with the wire located in said groove and leading through said hole.

10. The combination with a sound-box, of a stylus-wire, a rotatable part on which the wire is wound and by which it is adjustable, the rotatable part having a spiral groove wherein the wire is located, and a coöperating stationary part adjacent to said rotatable part, the side-walls of the spiral groove in the rotatable part being substantially normal thereto.

11. The combination with a sound-box, of a stylus-wire, of a stationary cylindrically hollow casing having a hole through it to deliver one end of the wire into an operative playing position, and a spirally grooved rotatable and endwise movable spool within said casing to which the other end of the wire is attachable with the wire located in said groove and leading through said hole in the spool-casing, the side-walls of said spiral groove in the rotatable spool being substantially normal to the cylindrical surface thereof.

12. The combination, with a sound-box; of a hollow, cylindrical casing arranged substantially tangentially of and connected to said sound-box; and a spool mounted within said casing and adapted to have a stylus-wire wound spirally around it; said casing being provided between its ends with an opening to deliver the free end of the wire into operative playing position, and said spool being arranged for both rotary and endwise movement in said casing to respectively feed the wire through said opening and bring its successive convolutions into alinement with the same.

13. The combination, with a sound-box; of a hollow, cylindrical casing connected thereto; a stylus-bar having a rocking mounting intermediate its ends on said casing, a spool mounted within said casing and adapted to have a stylus-wire wound spirally around it, said casing having a delivery opening for the wire intermediate its ends; and wire-holding means carried by the free end of the stylus-bar and having an axial opening which registers with the first-named opening; said spool being arranged for both rotary and endwise movement in said casing to respectively feed the wire through said openings into operative playing position and bring its successive convolutions into alinement with the same.

In testimony whereof, I have signed my name to this specification this 4th day of May, 1915.

CHARLES H. SHAW.

It is hereby certified that in Letters Patent No. 1,269,965, granted June 18, 1918 upon the application of Charles H. Shaw, of Babylon, New York, for an improvement in "Sound-Boxes," an error appears in the printed specification requiring correction as follows: Page 2, strike out lines 58-61, comprising claim 1, and insert the following in lieu thereof:

*1. The combination, with a sound-box, of a stylus-wire, and a rotatable part on which the wire is wound and by which it is adjustable, the rotatable part having a spiral groove wherein the wire is located.* and that the said Letters Patent should be read with this correction therein that the same may conform to the record of the case in the Patent Office.

Signed and sealed this 6th day of August, A. D., 1918.

[SEAL.]

R. F. WHITEHEAD,
*Acting Commissioner of Patents.*

Cl. 274—37.